(12) United States Patent
Kurtz et al.

(10) Patent No.: US 9,709,450 B2
(45) Date of Patent: Jul. 18, 2017

(54) APPARATUS AND METHOD FOR ELIMINATING VARYING PRESSURE FLUCTUATIONS IN A PRESSURE TRANSDUCER

(71) Applicant: Kulite Semiconductor Products, Inc., Leonia, NJ (US)

(72) Inventors: Anthony D. Kurtz, Saddle River, NJ (US); Adam Kane, Morristown, NJ (US); Richard Martin, Ridgewood, NJ (US); Robert Gardner, Westwood, NJ (US)

(73) Assignee: Kulite Semiconductor Products, Inc., Leonia, NJ (US)

( * ) Notice: Subject to any disclaimer, the term of this patent is extended or adjusted under 35 U.S.C. 154(b) by 163 days.

(21) Appl. No.: 14/057,745

(22) Filed: Oct. 18, 2013

(65) Prior Publication Data

US 2014/0041457 A1    Feb. 13, 2014

Related U.S. Application Data

(63) Continuation of application No. 13/084,850, filed on Apr. 12, 2011, now Pat. No. 8,561,470, which is a
(Continued)

(51) Int. Cl.
*G01L 7/00* (2006.01)
*G01L 7/02* (2006.01)
*G01L 9/06* (2006.01)

(52) U.S. Cl.
CPC ............... *G01L 7/022* (2013.01); *G01L 9/06* (2013.01)

(58) Field of Classification Search
CPC .................................................. G01L 19/0609
(Continued)

(56) References Cited

U.S. PATENT DOCUMENTS 3,463,011 A    8/1969    Ries Werner et al.
3,530,719 A    9/1970    Alffillisch
(Continued)

OTHER PUBLICATIONS

Author: A. B. Buchholz, Title: Investigation of Pressure Transducer Adapter Dynamics, Date: 1978, Publisher: Purdue University, Purdue e-Pubs, School of Mechanical Engineering, International Compressor Engineering Conference, pp. 9 total.*

*Primary Examiner* — Lisa Caputo
*Assistant Examiner* — Roger Hernandez-Prewitt
(74) *Attorney, Agent, or Firm* — Troutman Sanders LLP; James E. Schutz; Mark Lehi Jones (57) ABSTRACT

A differential pressure transducer employing a coiled tube to eliminate varying pressure fluctuations is provided. In one embodiment, a method comprises receiving, at an inlet tube of a dampening chamber, a main pressure, wherein the main pressure includes a static pressure component and a dynamic pressure component; filtering, by the inlet tube, at least a portion of the dynamic pressure component of the main pressure; outputting, from the inlet tube, a first filtered main pressure; receiving, at a volume cavity of the dampening chamber, the first filtered main pressure, wherein the volume cavity is operatively coupled to the inlet tube; filtering, by the volume cavity, at least a portion of the dynamic pressure component of the first filtered main pressure; outputting, from the volume cavity, a second filtered main pressure; and wherein the dampening chamber is tuned to a predetermined resonance frequency.

11 Claims, 4 Drawing Sheets

Related U.S. Application Data continuation-in-part of application No. 12/574,587, filed on Oct. 6, 2009, now Pat. No. 7,921,724, which is a continuation of application No. 12/151,816, filed on May 9, 2008, now Pat. No. 7,597,004.

(58) Field of Classification Search
USPC .................................................. 73/707, 721
See application file for complete search history.

(56) References Cited

U.S. PATENT DOCUMENTS

| | | |
|---|---|---|
| 3,534,612 A | 10/1970 | Buckland |
| 3,605,500 A | 9/1971 | Trekell |
| 3,613,455 A | 10/1971 | Hightower et al. |
| 4,143,545 A | 3/1979 | Sitabkhan |
| 5,004,215 A | 4/1991 | Aubry et al. |
| 5,052,586 A | 10/1991 | Philipp et al. |
| 5,121,637 A | 6/1992 | Philipp et al. |
| 5,745,588 A * | 4/1998 | Bartlett ............... H04R 1/2869 381/170 |
| 5,889,212 A | 3/1999 | Guthrie et al. |
| 6,543,291 B1 | 4/2003 | Kurtz et al. |
| 6,543,293 B1 | 4/2003 | Kurtz et al. |
| 6,612,179 B1 | 9/2003 | Kurtz |
| 6,688,182 B2 | 2/2004 | Kurtz et al. |
| 6,708,568 B2 | 3/2004 | Gleeson et al. |
| 6,742,394 B1 | 6/2004 | Stuttaford et al. |
| 6,848,319 B2 | 2/2005 | Gleeson et al. |
| 7,107,853 B2 | 9/2006 | Kurtz |
| 7,188,528 B2 | 3/2007 | Kurtz et al. |
| 7,597,004 B1 | 10/2009 | Kurtz et al. |
| 7,921,724 B2 | 4/2011 | Kurtz et al. |
| 2003/0140704 A1* | 7/2003 | Kurtz ...................... G01F 1/46 73/727 |

* cited by examiner

APPARATUS AND METHOD FOR ELIMINATING VARYING PRESSURE FLUCTUATIONS IN A PRESSURE TRANSDUCER

CROSS-REFERENCE TO RELATED APPLICATIONS

This application is a continuation application claiming priority to U.S. patent application Ser. No. 13/084,850, filed on Apr. 12, 2011 which is a continuation-in-part application of U.S. patent application Ser. No. 12/574,587, filed on Oct. 6, 2009, which is a continuation application claiming priority to U.S. patent application Ser. No. 12/151,816, filed on 9 May 2008, now U.S. Pat. No. 7,597,004, issued on Oct. 6, 2010, all of which are entitled "APPARATUS AND METHOD FOR ELIMINATING VARYING PRESSURE FLUCTUATIONS IN A PRESSURE TRANSDUCER", and are hereby incorporated in their entirety as if fully set forth herein.

FIELD OF THE INVENTION

This invention relates to pressure transducers and more particularly to a differential pressure transducer employing a coiled tube to eliminate varying pressure fluctuations.

BACKGROUND OF THE INVENTION

Differential pressure measuring devices usually include one of two design variations. In a first design two half bridge circuits are connected together to form a Wheatstone bridge. The half bridges are normally provided on a silicon sensing die. In this case, there are two separate dies, with a half bridge on each. Each of the devices are ported to the main or reference pressure. One device is ported to the reference pressure. For a differential pressure measurement, the half bridges are electrically connected to electrically subtract the high or main pressure from the low or reference pressure resulting in a voltage proportional to the difference pressure. These techniques are well known. See for example U.S. Pat. No. 6,612,179 issued on Sep. 2, 2003 to A. D. Kurtz and assigned to the assignee herein, namely Kulite Semiconductor Products and entitled Method and Apparatus for the Determination of Absolute Pressure and Differential Pressure Therefrom. This patent describes the combination of absolute and differential pressure sensing devices including a plurality of absolute pressure transducers, each transducer including a plurality of half bridge piezoresistive structures and a device which selectively couples at least one of the half bridges to another half bridge.

In other prior art configurations, a single pressure sensing capsule is employed with the reference pressure ported to the rear side of the silicon sensing die. The main pressure is ported to the top side of the silicon sensing die. This design requires the use of a Wheatstone bridge on a single die. The difference of the main and reference pressure results in the differential pressure. Again, the differential pressure results in a voltage output. This design requires the reference tube to be connected to the reference pressure inlet. In any event, in actual operation both types of differential pressure measuring devices can be subjected to pump ripple, or a sinusoidally varying pressure fluctuation. Normally pump pressure is desirable to be measured in systems having pumps. For example, in an automobile, the oil that lubricates the engine of a car must be forced at high pressure around channels in the engine. In order to operate, a pump is used, which pump normally is referred to as a gear pump.

The rotating cam shaft of the engine normally powers the oil pump, driving a shaft that turns a pair of intermeshing gear wheels inside a close fitting chamber. The oil enters the pump where it is trapped by the wheels. The wheels carry the oil around to the outlet, where the teeth come together as they intermesh. This action squeezes the oil and raises its pressure as it is close to the outlet. The speed of pumping is directly linked to the speed of the engine. In any event, in such a pump, the pressure at the output as well as pressure at the input is normally monitored. The pressures are monitored by a pressure transducer. However, these pressure transducers can be subjected to pump ripple or a sinusoidally varying pressure fluctuation. In an adverse situation, the pipe and cavity of the reference or main side of the sensor can be tuned to the frequency of the pump ripple. By this occurring, one creates a resonance in the tube which results in an amplified pressure being applied to the transducer. This amplified pressure can seriously harm the transducer as will be further explained.

It is also known that the pump ripple is a function of the number of gear teeth in the pump and the number of revolutions per minute of the teeth. This, as indicated, can vary as the RPM of the pump can vary, and hence such a tube must be selected to filter the range of frequencies to prevent resonance and amplification in the pump operating RPM range. It is understood that the resonance and amplification of the pump ripple pressure can exceed the rating of the sensing die or pressure capability of the structure. Exceeding the rated pressure imparts excessive stress on the die which experiences brittle failure. Aside from loss of the signal from the sensor, on a filter application, contaminates from the dirty side of the filter can be passed to the clean side, thus further destroying the sensor or equipment downstream. One therefore requires a pressure transducer which will operate to eliminate pump ripple or to eliminate varying pressure fluctuations in a sensor and still enable the sensor to be small and compact.

SUMMARY OF THE INVENTION

A differential pressure transducer having a sensor and for providing an output proportional to the difference between a main pressure $P_1$ and a reference pressure $P_2$, wherein one of the pressure inputs contains an undesirable varying pressure fluctuation which fluctuation can undesirably produce excessive stress on said sensor, comprising: said sensor having a deflectable diaphragm, said diaphragm having pressure sensing elements on said diaphragm which elements provide an output proportional to an applied pressure on said diaphragm; a first port communicating with one surface of said diaphragm to provide a first pressure thereto; a second port communicating with the other surface of said diaphragm to provide a second pressure thereto, a coiled tube in series with one of said ports and dimensioned to suppress said varying pressure fluctuation prior to the application of said associated pressure to said diaphragm. Alternative embodiments may comprise an adjustable dampening chamber that can comprise a spiral inlet tube and/or a volume cavity to attenuate unwanted pressure fluctuations in place of the coiled tube.

DETAILED DESCRIPTION

Figure 1:
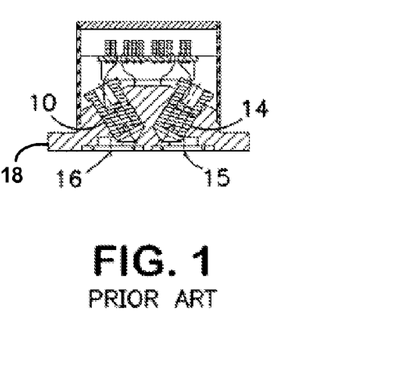
FIG. 1 illustrates a cross-sectional view of a differential transducer and housing having two headers according to the prior art.

Referring to FIG. 1, there is shown a typical prior art differential pressure transducer. The pressure transducer includes a housing 18. In the housing there is a main pressure header 10 and a reference pressure header 14. Both pressure headers contain piezoresistors sensors which are accommodated on silicon diaphragms. As one can ascertain, there is a main pressure port 16 to which a main pressure is applied and a reference pressure port 15 which a reference pressure is applied. The output of the device is proportional to the difference between the main pressure and the reference pressure. The design of FIG. 1 uses two pressure sensing capsules 10 and 14. Each capsule contains a half of a Wheatstone bridge on an associated silicon sensing die. For a differential pressure measurement, the half bridges are electrically connected to electrically subtract the high pressure from the low pressure. Each header is ported to the respective pressure port. Header 10 is ported to the main pressure port 16 and header 14 is ported to the reference pressure port 15. The half bridges on each of these sensors are electrically connected to electrically subtract the high pressure from the low pressure resulting in a voltage proportional to the difference in pressure.

Figure 2:
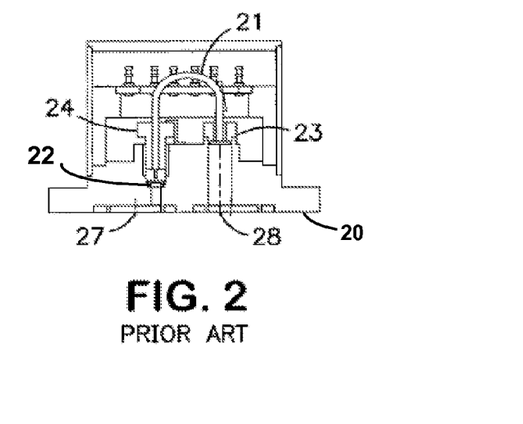
FIG. 2 is a cross-sectional view of prior art transducer having one header and operative in a differential mode.

Referring now to FIG. 2, there is shown a prior art pressure transducer which employs a reference tube and is a differential pressure transducer as indicated above. As seen, the pressure sensor or transducer is contained in a metal housing 20. There is a header 23 in the housing which header contains a single die or a semiconductor sensor 22 which basically is a full Wheatstone bridge. As seen, there is a lock nut 24 which couples the reference tube 21 to one side of the sensor 22. This tube 21 receives the reference pressure. The other side of the sensor is exposed to a main pressure port 28. The reference tube couples the reference pressure at port 27 to the other side of the sensor die to cause the Wheatstone bridge to produce an output which is the difference between the reference port pressure and the main port pressure. Therefore, as shown in FIG. 2, a single pressure sensor capsule is used, namely capsule 23. In this prior art design, a full Wheatstone bridge on a single die is used. The difference of the main and reference pressure results in only the differential pressure inducing stress in the sensing diaphragm.

In any event, as can be seen, FIG. 2 shows a single pressure sensing capsule with the reference pressure ported to the rear side of the silicon sensing die and the main pressure ported to the top side. In this design a full Wheatstone bridge on a single die is used as indicated. The difference of the main and reference pressure results in the differential pressure which induces stress in the sensing diaphragm. Again, the differential pressure results in a voltage output from the Wheatstone bridge. The design shown in FIG. 2 requires a reference tube to be connected to the reference pressure inlet. The low delta-p measurements of this design offers a much greater accuracy and hence is a preferred design for low pressure inputs. As indicated above, both designs can be subjected to pump ripple or a sinusoidally varying pressure fluctuation. In an adverse situation, the pipe and cavity of the reference pressure on one side of the sensor can be tuned to the frequency of this pump ripple if this occurs. If this occurs the pressure increases to a level high enough to break or rupture the diaphragm.

Figure 3:
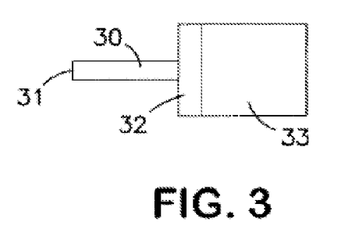
FIG. 3 is a diagrammatic view of a pressure transducer having a pipe and cavity and useful for explaining ripple operation.

Referring to FIG. 3 there is shown a pipe and cavity model which will be employed to explain how an equation for the resonance frequency of a pipe and cavity was derived. As seen in FIG. 3, there is a pipe 30 which has a diameter (d) and a length (l). The pipe has a pressure input port 31 which interfaces with a cavity 32 having a volume (v). The cavity, as well as the pressure inlet interfaces with a pressure transducer 33. Using standard system dynamic analysis, an equation was derived for the resonant frequency of a pipe and cavity as shown in FIG. 3. The port of the pressure sensor 31 is modeled as a series of pipes representing the orifice and fluid channels, and cavities in front of the sensing capsules. The Helmholtz equation for the resonant frequency ($F_n$) of the pipe/cavity system is:

$$F_n = \sqrt{(3\pi r^2 c^2 / 4lv/2\pi},$$

where r=internal radius of pipe;
c=velocity of sound in the pressure fluid;
l=length of pipe; and
v=volume of the cavity.

Thus, as indicated above, when the pipe and cavity structure of the passage is tuned to the pump ripple frequency, the pump ripple pressure is amplified. This resonance and amplification of the pump ripple pressure can exceed the rating of the sensing die or pressure capability of the structure. Exceeding the rated pressure applies excessive stresses on the die, which experiences brittle failure. Aside, from loss of the signal from the sensor, on a filter application, contaminates from the dirty side of the filter can be passed to the clean side, thus destroying the entire sensor or equipment downstream. For large tube or pipe diameters, the resonance is proportional to the radius. As the tube diameter gets smaller, capillary action takes over. As the tube diameter decreases below 0.040 inch, the change in resonant frequency diminishes. Thus there is a diminishing return with decreasing tube diameter. In addition, manufacturability decreases and the likelihood of trapping particles in the small diameter tube increases. The trapping of particles will clog the sensor and will decrease reliability. As can be seen from the above formula, the resonant or critical frequency (Fn) is also inversely proportional to the square root of the length of the pipe. In many design applications, the frequency can be suppressed merely by increasing the pipe length. In any event, by increasing the pipe length, one therefore increases the size of the sensor as the pipe has to be accommodated.

Figure 4:
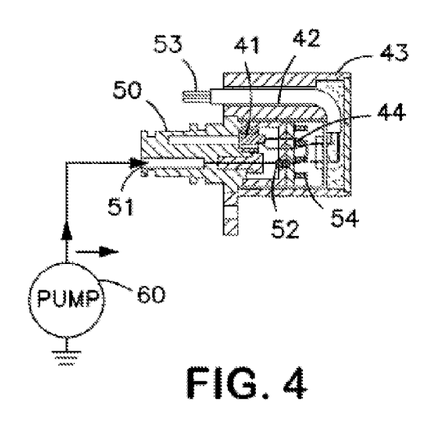
FIG. 4 is a cross-sectional view of a pressure sensor employing a coiled tube according to this invention.

Referring to FIG. 4 there is shown a differential sensor using a single silicon die (FIG. 2), which silicon die 41 contains a Wheatstone bridge and where the main pressure from a main pressure port 50 is applied to the top surface of the die, while a reference pressure 51 is applied to the bottom surface of the die. As seen, there is a coil 52 which basically is in series with the reference port inlet 51. The coil 52 is a tubular coil which essentially consists of a tube which is wound about a mandril having a screw type thread. In this manner the coil 52 is substantially decreased in length and now can be positioned inside the sensor. The dimensions of the coil are selected according to the above equation and the length of the coil is much longer than the length of the reference port and tube. Normally the reference port inlet would have to be expended by the length of the reference tube or the reference tube extended by the expanded length of the coil 52. This would of course create a problem in manufacturing a small sensor. Thus coiling of the tube 52 keeps the size minimized to aid compact packaging.

Also shown in the Figure is header 42 which essentially encompasses the silicon die. There is shown a terminal port 54 which receives leads from the silicon sensing die or from the Wheatstone bridge on the silicon sensing die and directs the outputs through cable 53. As seen, a pressure would be applied to the main port 50 while the reference pressure would be applied to the inlet port 51. The port 51 would be coupled to a pressure associated with a pressure derived from a pump 60. As indicated above, the pump 60 can be a gear pump or any other pump and would contain pump ripple. The pump ripple, due to the fact that it can occur over a fairly wide range of frequency such as three kilohertz (3 kHz) cycles to five kilohertz (5 kHz) cycles will cause resonance in the reference pressure path including tube 44. This resonance will cause amplification of the pressure which could result in exceeding the rating of the sensing die 41. This resonance and amplification of the pump ripple pressure can cause the sensing die to experience brittle failure and therefore destruction.

The coil 52 dimensions are selected based on the equation shown above and is maybe wound as indicated on a mandril or on a threaded screw. Typically the coil will have a diameter in the center of approximately three-eighth (⅜) inches with a tube having an outer diameter of 0.04 inches and an inner diameter of 0.02 inches and a length of two or more inches. These dimensions indicate a coil capable of suppressing pump ripple frequency between three kilohertz (3 kHz) to four kilohertz (4 kHz). It is of course understood that coiled structures have been used in conjunction with pressure transducers for other applications. For example reference is made to U.S. Pat. No. 7,188,528 issued on Mar. 13, 2007 and entitled Low Pass Filter Semiconductor Structures for use in Transducers for Measuring Low Dynamic Pressures in the Presence of High Static Pressures by A. D. Kurtz, et al, an inventor herein, and assigned to Kulite Semiconductor Products, Inc. That patent shows a long tube which basically acts as a low pass filter and will only pass frequencies which are below one hundred twenty Hertz (120 Hz). In this manner, the dynamic frequency which is five kilohertz (5 kHz) or greater will not pass through the tube. That patent, as indicated, shows a tube for operating as a low pass filter. It is also noted that the tube is not in any manner inserted into the pressure transducer as the tube will be too long to be conveniently employed. Reference is also made to U.S. Pat. No. 7,107,853 issued on Sep. 19, 2006 to A. D. Kurtz, an inventor herein, and entitled Pressure Transducer for Measuring Low Dynamic Pressures in the Presence of High Static Pressures. This patent is the parent application of the above noted patent, both of which are incorporated herein in their entirety. Thus there has been described a coil transducer which will operate to suppress pump ripple and prevent the pump ripple from being amplified and thus destroying the sensing die of a semiconductor pressure transducer.

Figure 5:
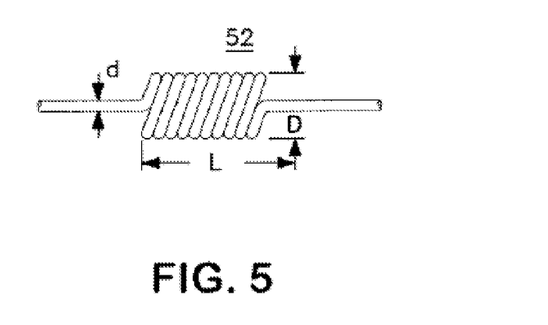
FIG. 5 is a schematic diagram of a coiled tube according to this invention.

FIG. 5 shows a coiled tube 52 having a length (L) of 0.4 inches, a tube diameter (d) of 0.04 inches and a coil diameter (D) of three-eighth (⅜) inches.

Figure 8:
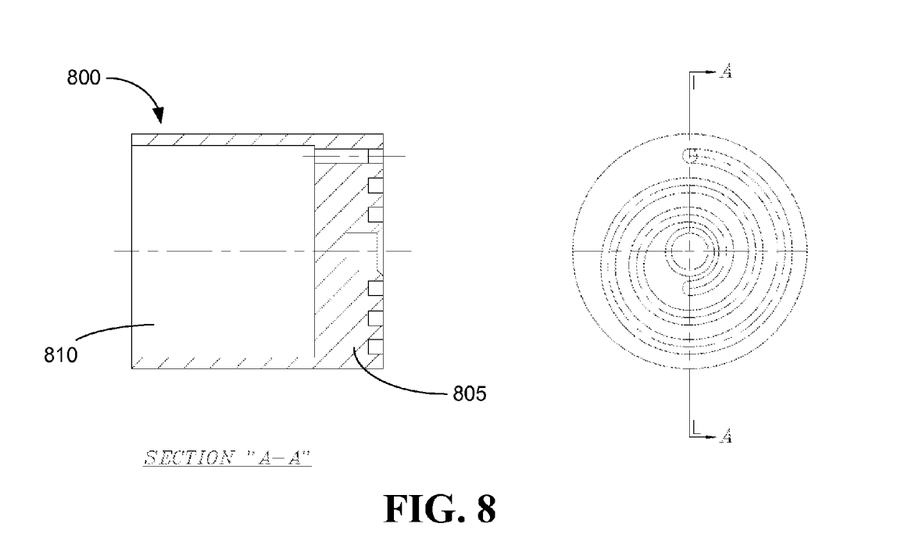
FIG. 8 illustrates an alternative embodiment for attenuating large dynamic pressure waves using an adjustable dampening chamber comprising a spiral inlet tube and a volume cavity.

Referring to FIG. 8, an alternative embodiment for attenuating large dynamic pressure waves caused by pump ripple is illustrated. This alternative embodiment can be used in place of the coiled tube 52 described above. This embodiment comprises an adjustable dampening chamber 800 that may include an inlet tube 805 having a first end and a second end and a volume cavity 810. The first end of the inlet tube 805 can be adapted to receive a fluid having a main or reference pressure and the volume cavity 810 can be adjacent the second end of the inlet tube 805. A sensor module can be attached to the end of the volume cavity opposite the second end of the inlet tube. The inlet tube 805 can be configured into a spiral shape and further, can be machined from a plate or shaped out of a straight elongated tube. As large dynamic pressure waves propagate through the fluid having a main or reference pressure, the inlet tube 805 and the volume cavity 801 dampen the large dynamic pressure waves (caused by pump ripple) before they reach and cause damage to the sensor module. Other exemplary embodiments, for example, can comprise a plurality of inlet tubes and/or volume cavities in series to achieve desired attenuation characteristics.

This alternative embodiment allows for adequate attenuation of dynamic pressure waves and enables accurate measurement of main, reference, and/or differential pressure within the system. The resonance frequency of the adjustable dampening chamber 800 can be tuned using the Helmholtz equation, defined above. Based on the Helmholtz equation, discussed in detail above, the length of the inlet tube 805, the diameter of the inlet tube 805, and the volume of the volume cavity 810 are parameters that can be manipulated to achieve a desired resonance frequency. One skilled in the art will appreciate that it is desirable to tune the adjustable dampening chamber 800 to an appropriate resonance frequency that dampens unwanted, destructive pressure waves but enables pressure waves to be measured by the sensor module (i.e., main or reference pressure) to pass through. Therefore, an appropriate interplay between inlet tube length, inlet tube diameter, and cavity volume must be made to achieve this balance. For example, the inlet tube 805 and volume cavity 810 can be tuned to attenuate large dynamic pressure waves of about one kilohertz (1 kHz) and higher and accurately pass through slower oscillating pressures of about one hundred Hertz (100 Hz) and lower.

The cross-section of the inlet tube 805 can be rectangular, circular, or many other geometrical shapes. In exemplary embodiments, wherein the cross-section of the inlet tube 805 is circular, the diameter can be about five thousandth of an inch (5 mils) to about fifty thousandth of an inch (50 mils) or larger. The length of the inlet tube 805 can range from about 0.25 inches to about five (5) inches. This configuration provides a compact inlet tube 805, which is important for maintaining the miniaturized size of the overall transducer system. One skilled in the art will appreciate that the geometrical configuration of the inlet tube 805 can be determined using the Helmholtz equation. The geometrical configuration of the inlet tube 805 can be tuned such that the resonance is well below the frequency of the dynamic pressure waves caused by pump ripple within the system. For example, if the system is experiencing dynamic pressure waves in a fluid at a frequency of fifteen hundred Hertz (1.5 kHz), the inlet tube 805 can be designed using the Helmholtz equation such that its resonance is about three hundred Hertz (300 Hz) to five hundred Hertz (500 Hz).

Figure 9:
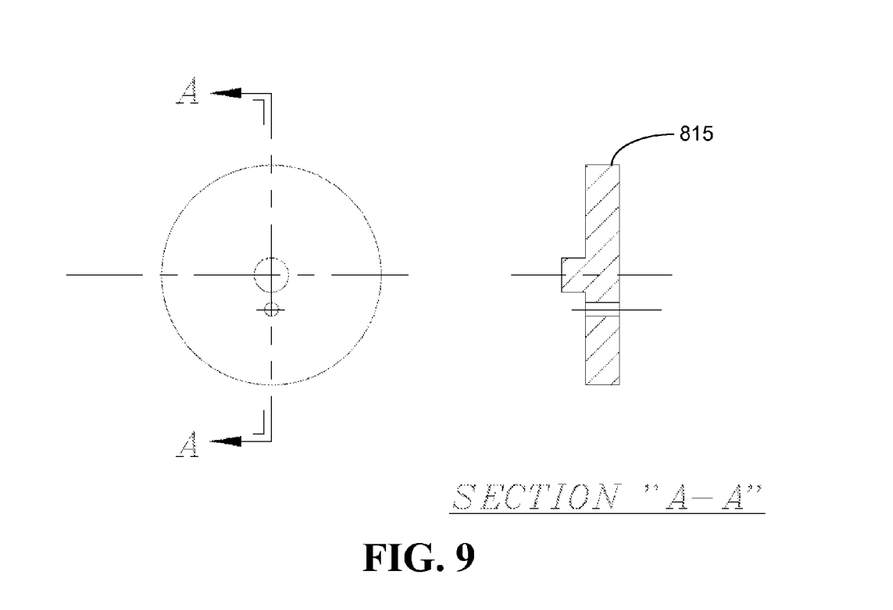
FIG. 9 illustrates a cover that can be welded to the adjustable dampening chamber, according to alternative embodiments of the present invention.
Figure 10:
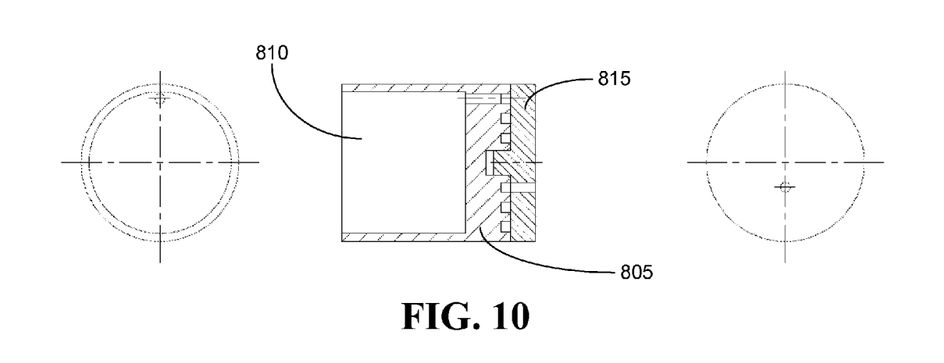
FIG. 10 illustrates the cover welded to the adjustable dampening chamber, according to alternative embodiments of the present invention.
Figure 11:
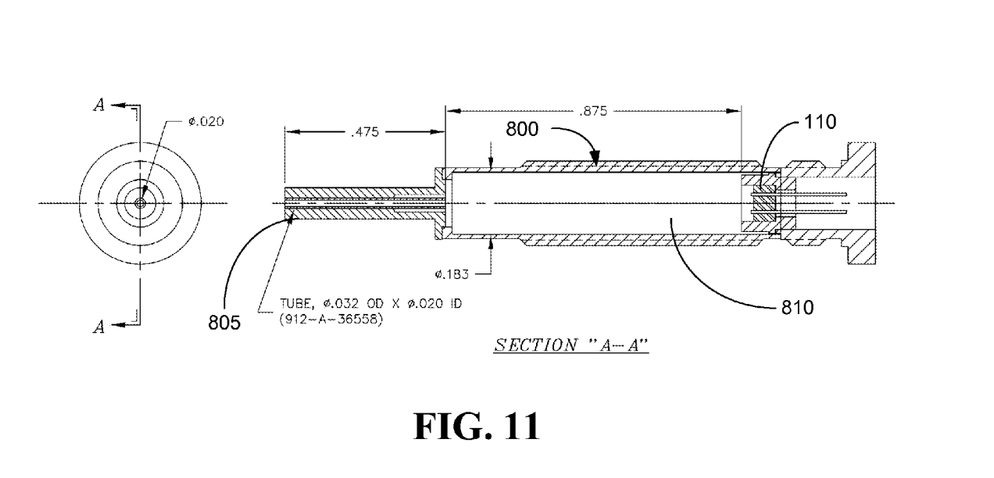
FIG. 11 illustrates the adjustable dampening chamber attached to a sensor module, according to alternative embodiments of the present invention.

A cover 815, as illustrated in FIG. 9, can be welded to the adjustable dampening chamber (for example, the adjustable dampening chamber 800 as shown in FIG. 8), which forces the pressure waves to propagate through the adjustable dampening chamber, and more specifically propagate through the inlet tube (for example, the inlet tube 805 as shown in FIG. 8). Referring to FIG. 10, there is shown the cover 815 aligned and welded to the inlet tube 805. Referring to FIG. 11, there is shown the adjustable dampening chamber 800 attached to a sensor module 110.

Figure 6:
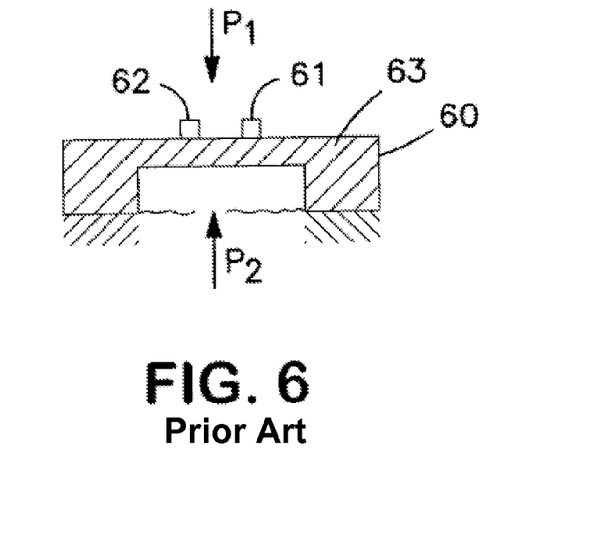
FIG. 6 is a cross-sectional view of a silicon sensor die used in this invention.

Referring to FIG. 6 there is shown a schematic cross-sectional view of a typical sensor module. The sensor module 60 contains a semiconductor substrate having a thin active area or diaphragm 63 upon which piezoresistors such as 61 and 62 are positioned. Such devices are extremely well known and the prior art is replete with semiconductor dies or semiconductor sensors using piezoresistors as 61 and 62 to form a Wheatstone bridge configuration. While two piezoresistors are shown, it is understood that there are normally four (4) piezoresistors. The sensor can be protected by coating it with a layer of silicon dioxide and essentially the pressure $P_1$ is applied to the top of the sensor active area as shown. The pressure may be transmitted to the sensor by an oil-filled cavity which is positioned above the sensor, as is also well known. In any event, the sensor has the pressure $P_1$ applied to the top side, which for example, may be the main pressure as applied to port 50 of FIG. 4. In any event, the reference pressure $P_2$, which for example emanates from the pump 60 of FIG. 4 is applied to the underside of the diaphragm. The Wheatstone bridge or sensor provides an output which is equal to $P_1-P_2$ which is the differential pressure. As seen in FIG. 6, the device is shown in FIG. 4 as sensor 41. Thus the sensor 41 or sensor 60 of FIG. 6 receives a pressure $P_1$ on the top side and pressure $P_2$ on the bottom side. As indicated and shown, pressure $P_2$ is derived from a gear pump 60 which may exhibit pump ripple, which ripple is suppressed by the coil 52 of FIG. 5 as explained in conjunction with FIG. 4.

Figure 7:
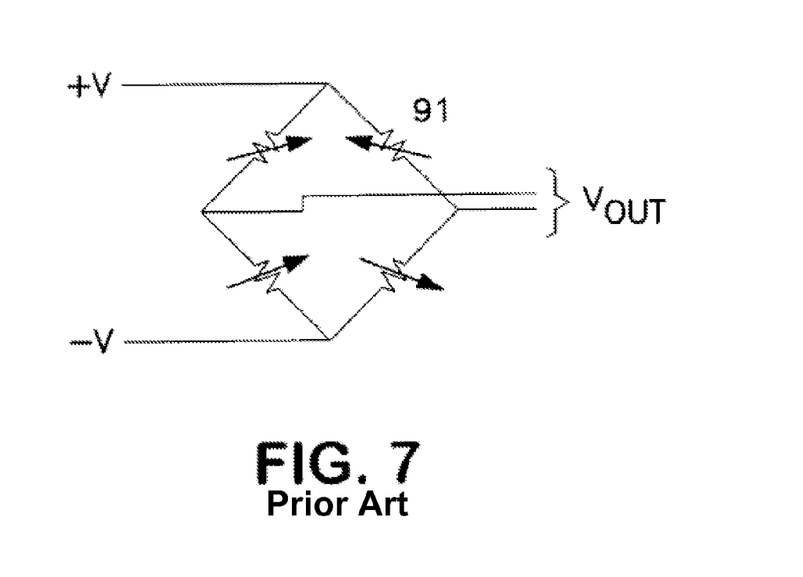
FIG. 7 is a schematic diagram of a Wheatstone bridge such as the type employed with the sensor of FIG. 6.

As shown in FIG. 7 there is a Wheatstone bridge configuration which is a typical sensor structure. The Wheatstone bridge, for example, has four resistors which can be piezoresistors as resistor 91 and so on. The piezoresistors change resistance according to an applied pressure. As seen there are five leads associated with the bridge. Two are used for biasing the bridge and three for providing an output. These leads as shown in FIG. 4 are directed out from the device via cable 53. Thus as shown above, there is a low pressure differential transducer which operates in conjunction with a coil to suppress pump ripple and therefore enable reliable operation during the presence of such ripple or other disturbing variations. This results in improved operation as compared to prior art devices while enabling one to make a extremely small transducer structure.

It should be apparent to one skilled in the state of the art that there are many alternate embodiments which can be determined or are deemed to be encompassed within the spirit and scope of the claims appended hereto.

The invention claimed is:

1. A method, comprising:
    tuning an adjustable dampening chamber for a predetermined resonance frequency, wherein the adjustable dampening chamber comprises a machined plate inlet tube, a machine plate inlet tube cover having an inlet hole, and an adjustable volume cavity in communication with the inlet tube, wherein the tuning comprises:
        selectively controlling a length of the inlet tube by alignment of the inlet hole of the machine plate inlet tube cover with respect to the machined plate inlet tube;
        controlling a cross-sectional diameter of the inlet tube; and
        controlling a volume of the adjustable volume cavity;
    installing, in a housing of a differential pressure sensor, the adjustable dampening chamber, wherein the differential pressure sensor comprises a diaphragm, and wherein the housing defines a main pressure port and a reference pressure port;
    configuring the main pressure port to be in communication with a first surface of the diaphragm;
    configuring the reference pressure port to be in communication with the inlet tube, wherein the reference pressure port is adapted to receive a reference pressure having a static pressure component and a dynamic pressure component, and wherein the inlet tube is configured to filter at least a portion of the dynamic pressure component of the reference pressure and to output to the adjustable volume cavity, a first filtered reference pressure;
    wherein the adjustable volume cavity is tuned to reduce at least a portion of the dynamic pressure component of the first filtered reference pressure and to output to a second surface of the diaphragm, a second filtered reference pressure.

2. The method of claim 1, further comprising:
    coupling a transducer to the diaphragm for measuring a difference between the main pressure and the second filtered reference pressure.

3. The method of claim 1, wherein the inlet tube is machined in a spiral shape.

4. The method of claim 1, wherein tuning the adjustable dampening chamber further comprises:
    machining a shape on a surface of the adjustable dampening chamber; and
    securing a cover over the machined shape to form at least a portion of the inlet tube.

5. The method of claim 1, wherein the adjustable dampening chamber comprises one piece, and wherein the adjustable volume cavity and the inlet tube are integrated in the adjustable dampening chamber.

6. The method of claim 1, wherein the adjustable dampening chamber is tuned to the predetermined resonance frequency using a Helmholtz equation.

7. The method of claim 1, wherein the inlet tube is defined by a cross-sectional diameter ranging from about five thousandth of an inch (5 mils) to about fifty thousandth of an inch (50 mils).

8. The method of claim 1, wherein the inlet tube has a length of about twenty-five hundredths (0.25) of an inch to about five (5) inches.

9. The method of claim 1, wherein a cross-section of the inlet tube is circular.

10. The method of claim 1, wherein the dynamic pressure component includes frequencies greater than one hundred Hertz (100 Hz).

11. The method of claim 1, wherein the volume cavity includes an array of volume cavities.

\* \* \* \* \*